United States Patent
Raza et al.

(10) Patent No.: US 8,996,772 B1
(45) Date of Patent: Mar. 31, 2015

(54) HOST COMMUNICATION DEVICE AND METHOD WITH DATA TRANSFER SCHEDULER

(75) Inventors: Syed Babar Raza, San Jose, CA (US); Pradeep Bajpai, Sunnyvale, CA (US); Hamid Khodabandehlou, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 491 days.

(21) Appl. No.: 13/430,648

(22) Filed: Mar. 26, 2012

Related U.S. Application Data

(60) Provisional application No. 61/599,283, filed on Feb. 15, 2012.

(51) Int. Cl.
*G06F 13/38* (2006.01)

(52) U.S. Cl.
CPC .................................... *G06F 13/385* (2013.01)
USPC ........................... 710/107; 710/310; 710/313

(58) Field of Classification Search
CPC .......... G06F 13/385; G06F 2213/0042; Y02B 60/1235
USPC .................. 710/107, 310, 313, 320
See application file for complete search history.

(56) References Cited

U.S. PATENT DOCUMENTS

| | | | |
|---|---|---|---|
| 5,592,682 A | 1/1997 | Chejlava, Jr. et al. | |
| 6,363,470 B1 | 3/2002 | Laurenti et al. | |
| 6,556,193 B1 * | 4/2003 | Auld et al. | 345/418 |
| 6,631,419 B1 * | 10/2003 | Greene | 709/238 |
| 6,721,815 B1 | 4/2004 | Leete | |
| 7,007,110 B2 | 2/2006 | Howard et al. | |
| 7,149,839 B2 * | 12/2006 | Aull et al. | 710/310 |
| 7,165,125 B2 | 1/2007 | Lissel et al. | |
| 7,174,408 B2 * | 2/2007 | Ede | 710/306 |
| 7,177,314 B2 * | 2/2007 | Wu et al. | 370/395.51 |
| 7,339,923 B2 | 3/2008 | Rogers | |
| 7,409,468 B2 | 8/2008 | Biran et al. | |
| 7,409,476 B1 * | 8/2008 | Liang et al. | 710/52 |
| 7,433,363 B2 | 10/2008 | Rosen et al. | |
| 7,490,255 B2 | 2/2009 | Diefenbaugh et al. | |
| 7,546,409 B2 * | 6/2009 | Gough et al. | 710/313 |
| 7,634,587 B2 * | 12/2009 | Ferguson et al. | 710/5 |
| 8,433,936 B2 * | 4/2013 | So et al. | 713/320 |
| 8,509,695 B2 * | 8/2013 | King et al. | 455/62 |
| 2003/0177297 A1 | 9/2003 | Hesse et al. | |

OTHER PUBLICATIONS

Alan Jay Smith_Internal Scheduling and Memory Contention_Dated Jan. 1981_12 pages.
Program in C_28 pages.
Sami Khun and Hsiu-Chin Hsu_Visualizing the CPU Scheduler and Page Replacement Algorithms_5 pages.
Search Report for U.S. Appl. No. 13/430,648, Dated Mar. 2012, 12 pages.

* cited by examiner

*Primary Examiner* — Brian Misiura

(57) ABSTRACT

A device can include a processor configured to write a first data structure to a memory, the first data structure comprising a list of at least one data channel; and a scheduler circuit comprising logic circuits responsive to the processor, the scheduler circuit configured to transfer data packets to the at least one data channel via a packet based serial data communication interface and according to the first data structure.

20 Claims, 10 Drawing Sheets

(BACKGROUND)

(BACKGROUND)

(BACKGROUND)

(BACKGROUND)

(BACKGROUND)

HOST COMMUNICATION DEVICE AND METHOD WITH DATA TRANSFER SCHEDULER

This application claims the benefit of U.S. provisional patent application Ser. No. 61/599,283 filed on Feb. 15, 2012, the contents of which are incorporated by reference herein.

TECHNICAL FIELD

The present disclosure relates generally to communication devices, and more particularly to devices that can control data transfers over a communication channel, including universal serial bus (USB) host devices.

BACKGROUND

FIGS. 10A to 10D shows a conventional universal serial bus (USB) system 1000. A system 1000 can include a controller section 1002 and a system memory 1004. A controller section 1002 can include a processor 1006 and a host controller driver (HCD) 1008, which is software executed by the processor.

Referring to FIG. 10A, it is assumed that in a previous operation HCD 1008 has created a data structure 1010 in system memory 1004 that includes a linked-list of USB endpoint descriptors (EP1, EP2). As is well known, endpoint descriptors (EP1, EP2) can describe logical endpoints for data transfers. Though not shown in FIG. 10A, each USB endpoint descriptor (EP1, EP2) can include a pointer to a queue of one or more USB transfer descriptors. The USB transfer descriptors define buffer sections accessed in a data transfer operation. A processor 1006 can traverse the data structure 1010, servicing endpoints according to a predefined order, to thereby control transfers over one or more USB buses. FIG. 10A also shows transfer data 1012 arriving for a new endpoint (EP3). The data structure 1010 remains unchanged as only part of the transfer data has been received.

Referring to FIG. 10B, in response to receiving all of the transfer data 1012, HCD 1008 (by operation of processor 1006) modifies data structure 1010 by inserting a new USB endpoint (EP3), along with USB transfer descriptors (TD0 to TDn) for the new endpoint (EP3). The newly added USB transfer descriptors (TD0 to TDn) can have physical memory addresses to locations of the transfer data.

It is noted that HCD 1008 stores the entire transfer data 1012 in system memory 1002 before scheduling transfer packets (by inserting transfer descriptors into the data structure). Further, modifications to data structure 1010 may require halts to the processing of endpoints.

Referring to FIG. 10C, with changes to the data structure 1010 complete, transfers for the new EP (EP3) can take place. Processor 1006 can initiate a transfer by sending a control packet (OUT TOKEN) for a data channel.

As shown in FIG. 10D, as processor 1006 traverses the data structure 1010 and arrives at endpoint EP3, it can start transferring the data via a data packet.

FIG. 11 is a diagram showing a representation of another conventional USB system 1100. A processor 1106 can manage a data structure in system memory 1104 that includes "vertical pointers" 1110-0 and "horizontal pointers" 1110-1. A processor 1106 manages the data structure 1110-0/1, updating the various pointers as requests for adding endpoints, removing endpoints, and adding new data transfers is received.

Horizontal pointers 1110-1 can be linked-lists of endpoints (EP0 to EP3), where each endpoint points to a queue of transfer descriptors (TD0 to TDn).

Vertical pointers 1110-0 can be the queues of transfer descriptors, each identifying a buffer of data that transmits or receives data for its endpoint. Such vertical pointers 1110-0-0 can include physical addresses identifying locations in a buffer memory 1114 for receiving/storing transfer data.

From the above, it is understood that in conventional systems, for large data transfers, a large amount of system memory can be needed to buffer the data prior to constructing endpoint descriptors for the data. Further, a processor must dedicate significant bandwidth to manage the data structure, as it is traversed and updated. Correspondingly, an HCD can be a relatively complex piece of software, in order to manage the data structure.

When a USB controller is implemented as an integrated circuit, the need for relatively large memories (to accommodate large data transfer sizes, and a complex HCD), can lead to large die size, increasing cost and footprint: both can be undesirable, particularly in portable devices. Further, a larger memory in combination with an active processor, can increase power consumption of the device, another undesirable feature.

Standard USB systems typically include a computer (e.g., desktop or laptop computer) as a host device. In such systems, there can be sufficient computing power and memory to accommodate data transfers among various peripheral (i.e., slave) devices. However, portable standards have arisen, such as USB on-the-go (USB-OTG), which can enable devices that are typically peripherals to operate as hosts. Thus, a smaller device, such as a camera, printer or keyboard, can connect directly to another peripheral device, and act as a host device in the system.

However, implementing conventional host architectures into such smaller devices can often require undesirably large die sizes and power consumption, as noted.

DETAILED DESCRIPTION

Figure 1:
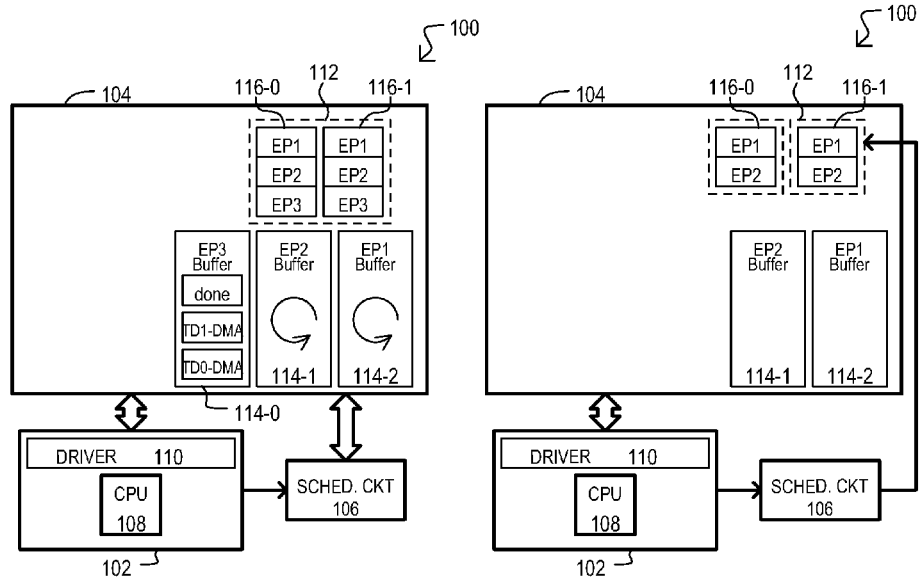
FIG. 1 is a block schematic diagram of a communication device according to an embodiment.

Various embodiments will now be described that show host devices, circuits, and methods that can provide improved performance over conventional architectures.

Processor bandwidth and memory size requirements can be reduced, and performance for data transfers can be increased.

In the various embodiments shown below, like items are referred to by the same reference character but with the first digit(s) corresponding to the figure number.

FIG. 1 shows a communication device 100 according to an embodiment. A communication device 100 can include a processor section 102, a memory 104, and a scheduler circuit 106. A processor section 102 can include one or more processors, and in the embodiment shown, includes one processor 108. By operation of processor 108, processor section 102 can also include driver software 110. In particular embodiments, driver software 110 can include instructions stored in a memory executable by processor 106. Driver software can define data structures that can be created by processor 106 within memory 104.

It is noted that while processor section 108 of FIG. 1 is shown to include a central processing unit (CPU), in alternate embodiments a processor can include any suitable state machine that can create data structures in a memory as described herein, or equivalents.

A memory 104 can store data structures that enable the servicing of data transfers for channels via one or more communication channels. In the embodiment shown, a memory 104 can include a "ping-pong" schedule memory (hereinafter schedule memory 112) and buffers (three shown as 114-0 to -2). A schedule memory 112 can include two data structures 116-0/1 which can represent a schedule for processing data transfers to endpoints. It is understood that the term "endpoint" as used herein is not intended to imply any particular communication standard. Rather, the endpoint describes a logical channel for data (including both into the device and out of the device).

The data structures 116-0/1
-0/1 can be conceptualized as having static or update roles. When assuming a static role, a data structure can be accessed to process data transfer requests to endpoints. While one data structure has the static role, the other data structure can assume the update role, being available for modifications that reflect any changes to the endpoints (e.g., addition/removal of endpoints, addition/removal of transaction for endpoints). Once an update data structure has been modified, it may assume the static role, and the (previously static) data structure can assume the update role.

In the embodiment shown, a processor 108 can implement changes to an update data structure (116-0 or -1) via driver software 110.

A device 100 can include a buffer 114-0 to -2 in memory 104 corresponding to each endpoint present in a static data structure (116-0 or -1). As transfer data become available for an endpoint, a pointer (two shown as TD1-DMA, TD0-DMA) can be written into the corresponding buffer (114-0 to -2). In very particular embodiments, a pointer (e.g., TD1-DMA, TD0-DMA) can enable a direct memory access to a buffer location in memory 104 to enable data to be read from, or written into, the buffer location. In some embodiments, buffers 114-0 to -2 can be circular in that a newest pointer can reference back to an oldest pointer. In some embodiments, circular buffers (114-0 to -2) can have defined sizes selected for a maximum anticipated data transfer rate. However, in other embodiments, sizes for circular buffers (114-0 to -2) can be allocated dynamically.

It is noted that while the particular embodiment of FIG. 1 shows schedule memory 112 and buffers 114-0 to -2 in memory 104, such structures could reside in different memories.

Figure 10A:
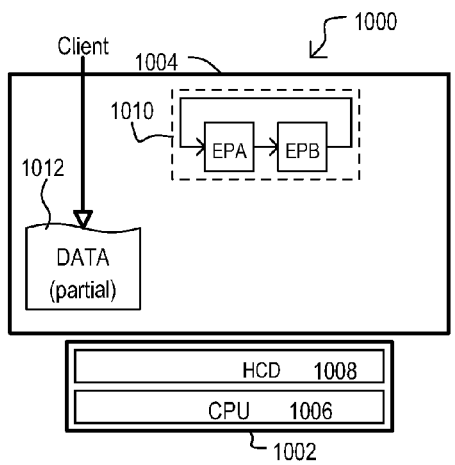
FIGS. 10A to 10D are block schematic diagrams of a conventional universal serial bus (USB) system and operations according to an embodiment.

A scheduler circuit 106 can operate separately from a processor 108 to traverse the current static data structure (116-0 or -1), and thereby process data transfers to endpoints. This is in contrast to conventional approaches, like that of FIGS. 10A/B and 11, in which a processor both updates and traverses a data structure. A scheduler circuit 106 can operate in response to a processor 108 to switch between data structures 116-0/1 as they are updated. That is, a scheduler circuit 106 can be actively processing a current static data structure (e.g., 116-0), while processor 108 modifies the current update data structure (e.g., 116-1). Once a processor 108 has completed an updated data structure for the scheduler circuit 106, an indication can be provided to scheduler circuit 106 to switch schedule. In response to such an indication, a scheduler circuit 106 can stop processing data structure 116-0 and start processing data structure 116-1 (i.e., data structure 116-0 now has the update role and data structure 116-1 has the static role). An indication from processor 108 to a scheduler circuit 106 can take any suitable form, including but not limited to, a control signal, a write to a control register within the scheduler circuit, or a write to a control register within processor section 102 that is read by the scheduler circuit.

Having described various sections of a device in FIG. 1, very particular operations of such a device will now be described with reference to FIGS. 2A to 2G.

Figure 2A:
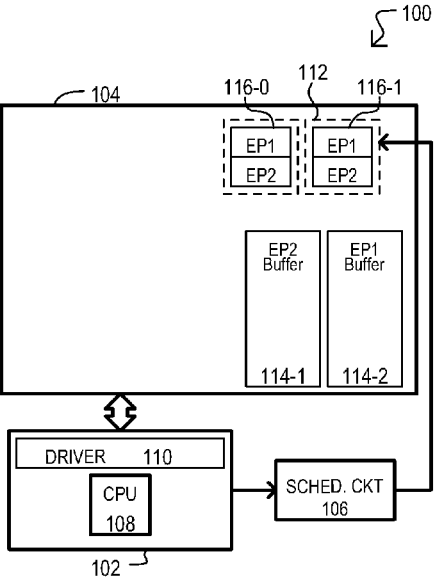
FIGS. 2A to 2H are a series of block schematic diagram showing operations for a device like that of FIG. 1 according to embodiments.

FIG. 2A shows a device 100 in a state in which scheduler circuit 106 is active, accessing data structure 116-1 to service data transfers for a set of endpoints (in the embodiment shown, endpoints EP1, EP2). Thus, data structure 116-1 can have a static role, while data structure 116-0 has an update role. As shown, an update data structure 116-0 can match the static data structure 116-1. It is understood that any of buffers 114-1/2 of the existing endpoints can include pointers corresponding to data transfer operations. These pointers are not shown to avoid cluttering the view.

Figure 2B:
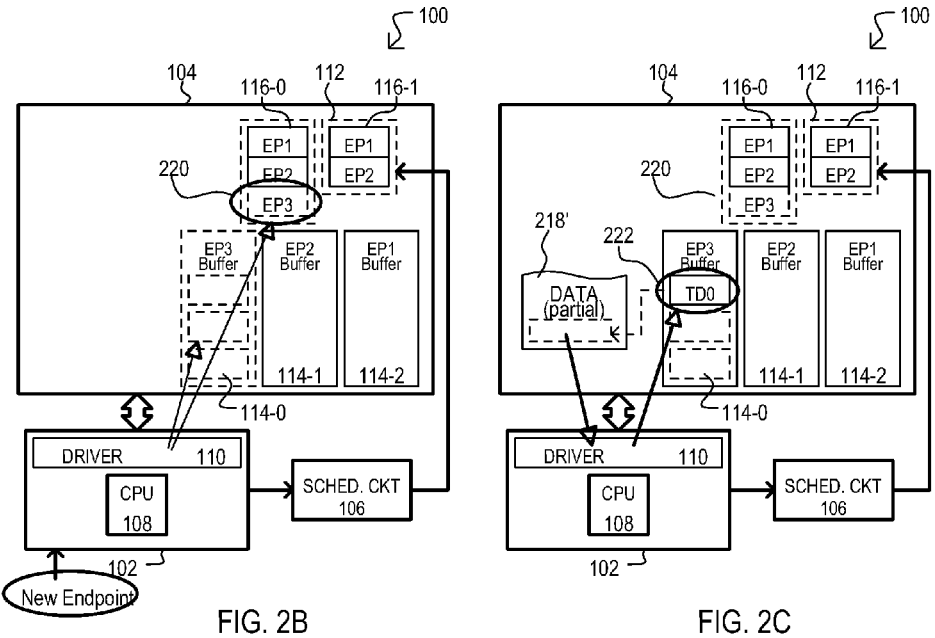
Figure 2C:
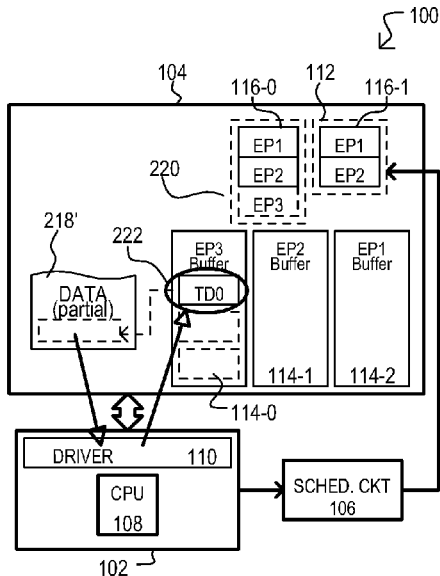
Figures 2D, 2E:
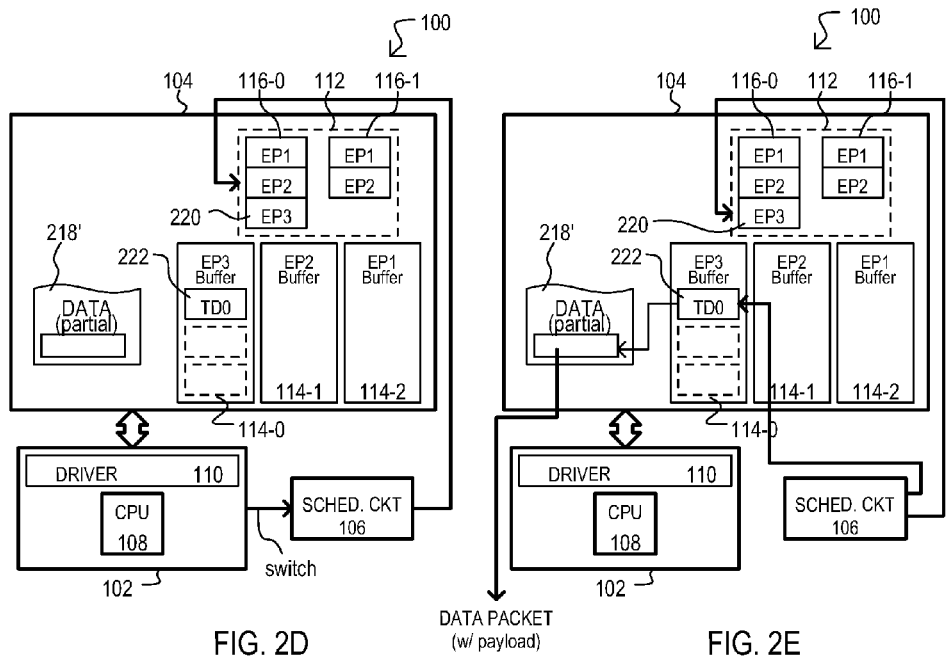

FIGS. 2B to 2D, show a device 100 update operation.

Referring to FIG. 2B, a new endpoint (EPs) can be enabled for the device 100. In response to the new endpoint, processor 108, via driver software 110, can update data structure 116-0 to include the new endpoint 220. In some embodiments, a buffer for EP3 114-0 can be pre-defined for the new endpoint. However, in other embodiments, a processor section 102 can define a buffer 114-0 for the new endpoint.

Referring to FIG. 2C, in the embodiment shown, partial transfer data 218' can arrive. It is assumed that partial transfer data 218' can be buffered in memory, and is to be transferred out of the device 100 via endpoint EP3.

FIG. 2D shows a device 100 in an on-the-fly schedule switch operation. It is assumed that processor 108 has stopped updates to data structure 116-0. A processor section 102 can provide an indication (switch) to scheduler circuit 106. In response, scheduler circuit 106 can cease traversing data structure 116-1, and start traversing data structure 116-0, which now includes the new endpoint EP3 220. Such an operation can be in contrast to conventional approaches that can cease traversing a single data structure while it is being updated.

FIG. 2E shows a device 100 processing an endpoint. In FIG. 2E it is assumed that scheduler circuit 106 has traversed various endpoints within (now) static data structure 116-0, to arrive at endpoint 220 (EP3). Scheduler circuit 106 can access data for EP3, which can indicate that transfer data exists for the endpoint. Scheduler circuit 106 can then access the corresponding buffer 114-0, which can contain pointer 222. According to a physical address location within buffer 114-0, a portion of partial transfer data 218' can be accessed. In the very particular embodiment shown, such partial transfer data 218' can be transmitted as payload within a data packet. As understood from above, the processing of endpoint 220 (EP3) can occur without taxing resources of processor 108.

Figures 2F, 2G:
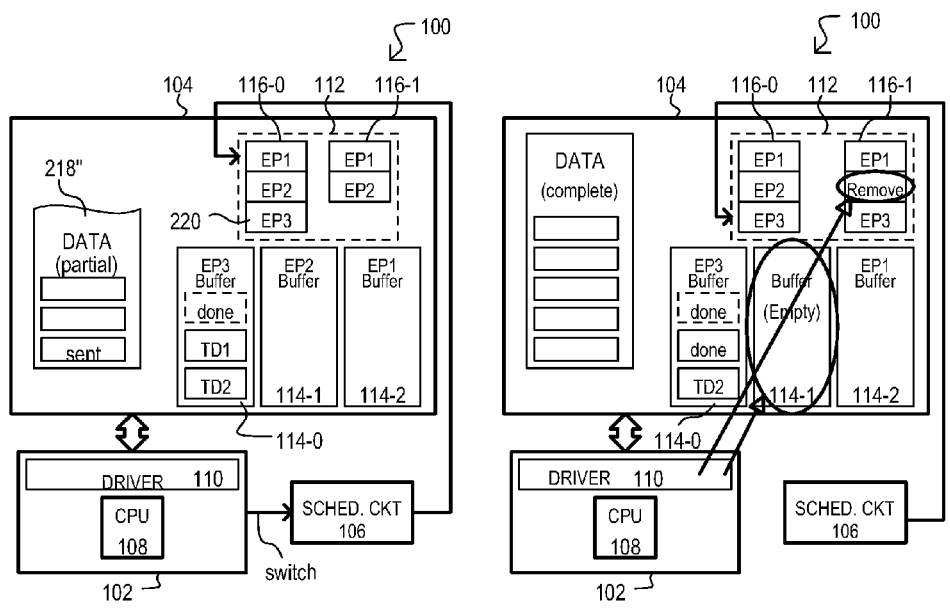
Figure 10B:
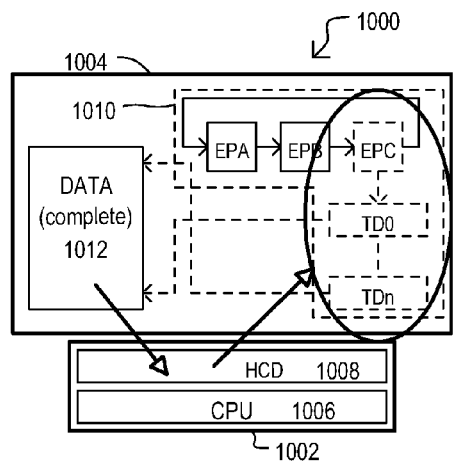
Figure 10C:
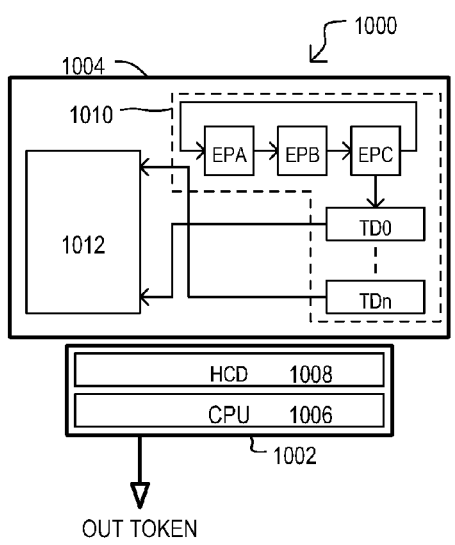
Figure 10D:
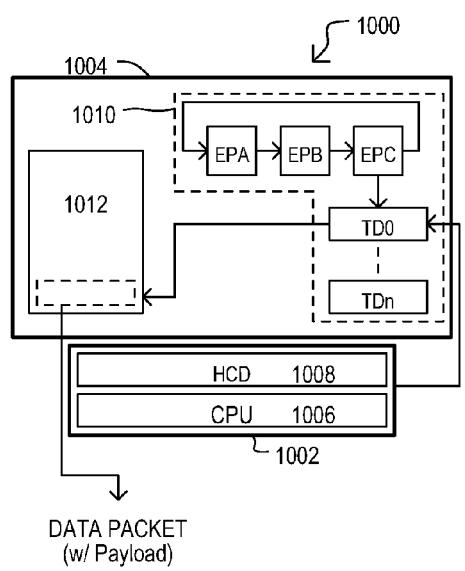

FIG. 2F shows a device 100 scheduling data transfers based on data availability. In FIG. 2F it is assumed that additional data arrives, leading to a larger amount of partial transfer data 218". However, it is understood that unlike the conventional arrangement of FIG. 10B, partial transfer data 218" represents only a portion of a larger amount of data requested for transfer by a client application. Thus, data transfers can be scheduled based on data availability, and not wait for all data for a transfer to be received.

As noted above, in some embodiments, each of buffers 114-0 to 114-2 can be configured when a device 100 is initialized. In particular embodiments, each of buffers 114-0 to 114-2, can include transfer descriptors (TD) identifying physical memory locations that buffer transfer data 218". For example, each buffer (114-0 to 114-2) can include some number of TDs, with a last TD referencing back to a first TD, creating a circular buffer. A rate at which buffers are serviced can be selected to be faster than a rate at which data arrives. Thus, buffers do not need to be added during the operation of the device.

In addition or alternatively, in other embodiments, buffers (114-0 to 114-2) can be dynamically allocated based on data transfer needs.

Figure 2H:
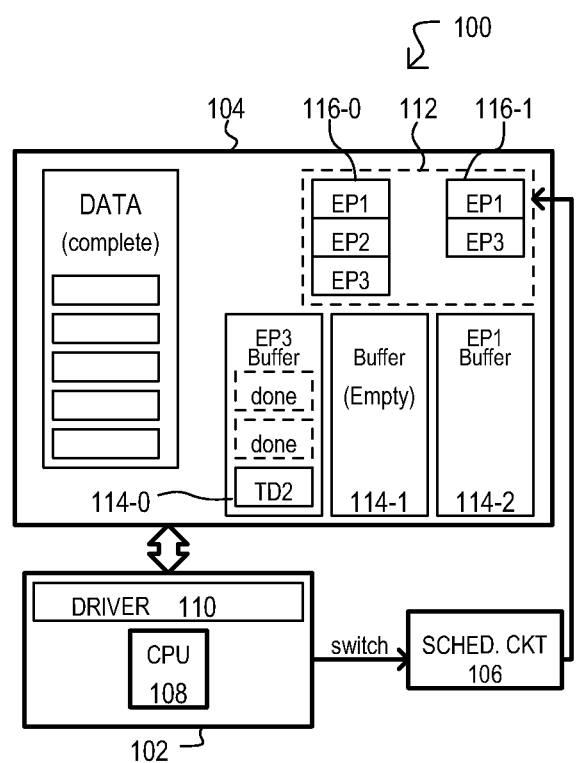

FIGS. 2G and 2H show another device 100 update operation.

Referring to FIG. 2G, in the very particular embodiment shown, endpoint EP2 is to be removed. A processor 108, via driver software 110, can remove endpoint EP2 from update data structure 116-1. Further, buffer 114-1 can be designated as empty. In some embodiments, that can include allowing the memory space occupied by buffer 114-1 to be freed up for other purposes. In other embodiments, such a memory space can be reserved to serve as the buffer for a newly added endpoint at a later time. At this time, scheduler circuit 106 can continue to traverse static data structure 116-0.

FIG. 2H shows another on-the-fly schedule switch operation. It is assumed that processor 108 has stopped updates to data structure 116-1. A processor section 102 can provide an indication (switch) to scheduler circuit 106. In response, scheduler circuit 106 can cease traversing data structure 116-0, and start traversing data structure 116-1, which no longer includes endpoint EP2.

Figure 3:
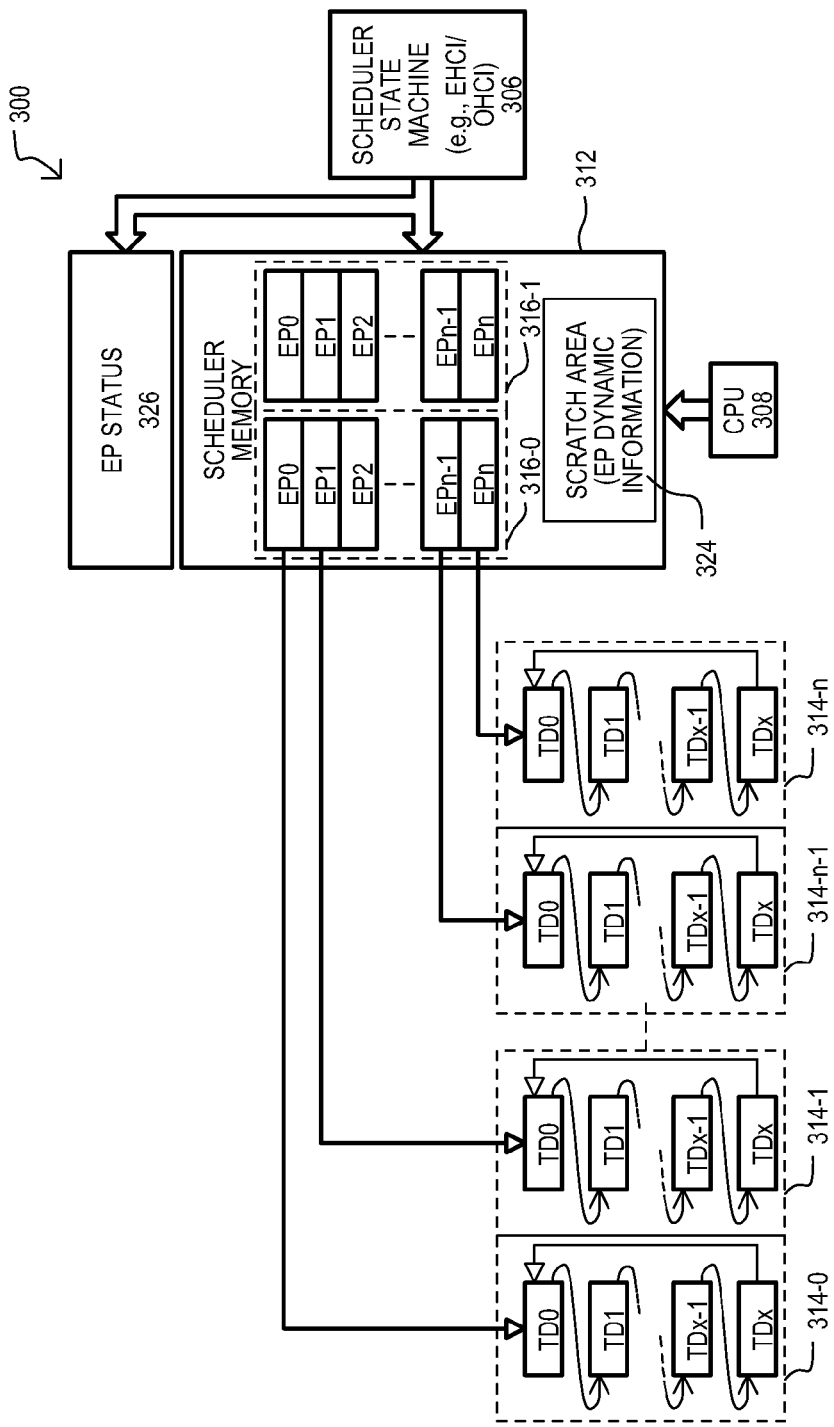
FIG. 3 is a block schematic diagram of a communication device according to another embodiment.

Referring now to FIG. 3, a device 300 according to a further embodiment is shown in a block schematic diagram. In very particular embodiments, a device 300 can be one implementation of that shown in FIG. 1.

A device 300 can include a schedule memory 312 accessible by a scheduler circuit 306 and a processor 308. A scheduler memory 312 can include data structures 316-0/1 to enable "ping-pong" like switching as noted above, or equivalents. Each data structure 316-0/1 can include a sequence of data channels (endpoints EP0 to EPn), with each endpoint (EP0 to EPn) referencing a different buffer 314-0 to -n.

In FIG. 3, schedule memory 312 is also shown to include a scratch area 324. A scratch area 324 can store dynamic information for an endpoint in the event a scheduler circuit 306 switches between data structures 316-0/1 while processing an endpoint. Thus, a state of an active endpoint can be preserved while switching between data structures 316-0/1. Accordingly, in response to a switch indication, a scheduler circuit 306 can write status data for the endpoint. As but a two of many possible examples, status data can include a running byte count for data being transferred and/or an error count for the transfer.

FIG. 3 further shows endpoint state data 326. Endpoint state data 326 can present the status of any endpoint transactions. Software executed by processor 308 can access such data. In very particular embodiments, in response to endpoint status data 326, a processor 308 can modify pointers within buffer (314-0 to -n). As but one examples, if endpoint state data 326 indicates a transaction is successful, a processor 308 can link the corresponding pointer to a "done" list, and notify applications (e.g., client applications) of such completion.

In some embodiments, a scheduler circuit 306 can be implemented as a state machine that follows an existing list processing specification. However, as in embodiments above, scheduler circuit 306 can be different from processor 308. In one very particular embodiment, a device 300 can be a universal serial bus (USB) host, endpoints (EP0 to EPn) can have the structure of USB endpoint descriptors, and a scheduler circuit 306 can process data structures in compliance with the Open Host Controller Interface (OHCI) and/or the Enhanced Host Controller Interface (EHCI) Specifications.

While the above embodiments have shown various devices and corresponding methods, additional methods will now be described with reference to a number of flow diagrams.

Figure 4:
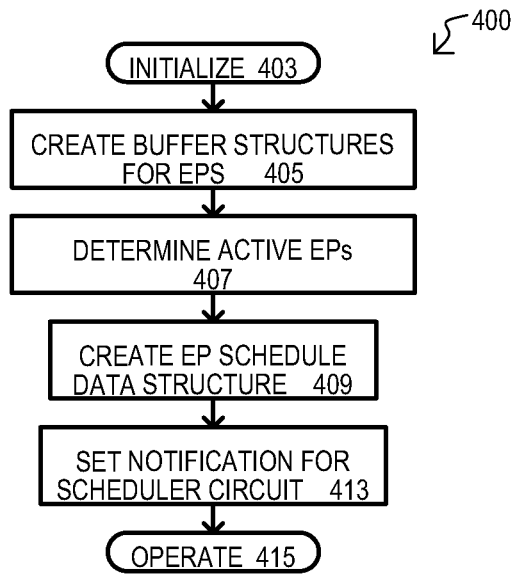
FIG. 4 is a flow diagram of an initialization method according to an embodiment.

FIG. 4 is a flow diagram of a method 400 according to an embodiment. A method 400 can be an initialization step for a device that creates a data structure, and then activates a scheduler circuit to process the data structure.

A method 400 can include starting an initialization operation 403. A device can create buffer structures for endpoints 405. In some embodiments, such an action can include indicating where data for an endpoint is stored (or to be stored). In a particular embodiment, buffers can be made available for multiple endpoints, with each buffer having a sequence of pointers to physical locations in memory. As noted above, in very particular embodiments, such buffers can be circular buffers.

A method 400 can then check to see if any endpoints are enabled for the device (e.g., channels for data are known) 407. A method 400 can create a schedule data structure for such endpoints. It is noted that in some embodiments, there can be a minimum endpoint requirement (at least one endpoint can exist).

A method 400 can set a notification for a scheduler circuit 413. Such an action can include providing an indication to a scheduler circuit as described in other embodiments herein, or equivalents. It is understood that such an action can result in a scheduler circuit traversing the data structure created in box 409 to execute data transfers for any enabled endpoints according to a predetermined order.

In the embodiment of FIG. 4, following the activation of a scheduler circuit 413, a method 400 can proceed to an operational state 415.

In one embodiment, actions of method 400 can be executed by a processor that is separate from the scheduler circuit indicated in box 413.

Figure 5:
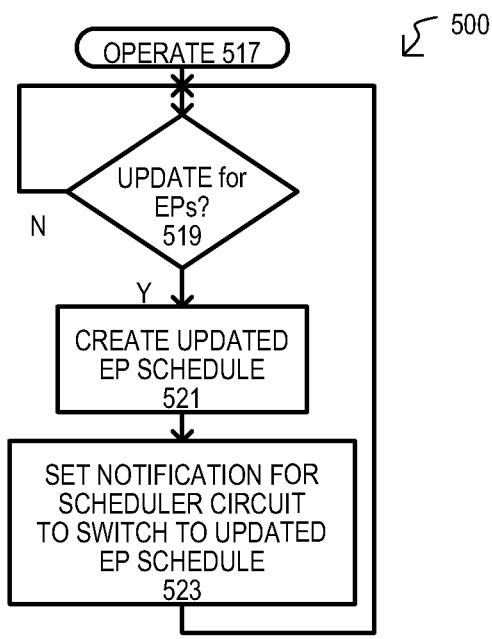
FIG. 5 is a flow diagram of an operation method according to an embodiment.

FIG. 5 is a flow diagram of a method 500 according to another embodiment. A method 500 can represent operational actions of a device that can allow a static data structure to be accessed while an updated data structure is created. In very particular embodiments, a method 500 can be one implementation of the operational state shown as 415 in FIG. 4.

A method 500 can include starting an operational state 517. A method 500 can determine if endpoint data needs to be updated 519. For example, action 519 can determine if any endpoints are disabled, or if any endpoints are newly enabled. If endpoints do not need to be updated (N from 519), a method 500 can continue to monitor for changes in endpoints.

Referring still to FIG. 5, if endpoints changes exist (Y from 519), a method 500 can include creating an updated data structure for such endpoints 521. Such an action can include taking a copy of an endpoint schedule currently being serviced by a scheduler circuit, and adding or removing endpoints according to the desired changes.

Referring to FIG. 5, if an updated EP schedule is created, a method 500 can set a notification for a scheduler circuit to switch to the updated EP schedule 523. Such an action can include providing an indication to a scheduler circuit as described in other embodiments herein, or equivalents. A method 500 can then return to 519.

In one embodiment, actions of method 500 can be executed by a processor that is separate from the scheduler circuit indicated in box 523.

Embodiments as described herein can be implemented in any suitable host device that controls communications over a communication channel. Communication channels include, but are not limited to, serial communication links and parallel communication links over physical buses and/or wireless channels.

However, in particular embodiments, a devices and methods as described herein can be included in "dual-purpose" devices. A dual-purpose device can be a device capable of operating as either a host, which controls data transfers over a communication channel, or as a secondary device, which transfers data on the channel only when indicated by the host.

Figure 6:
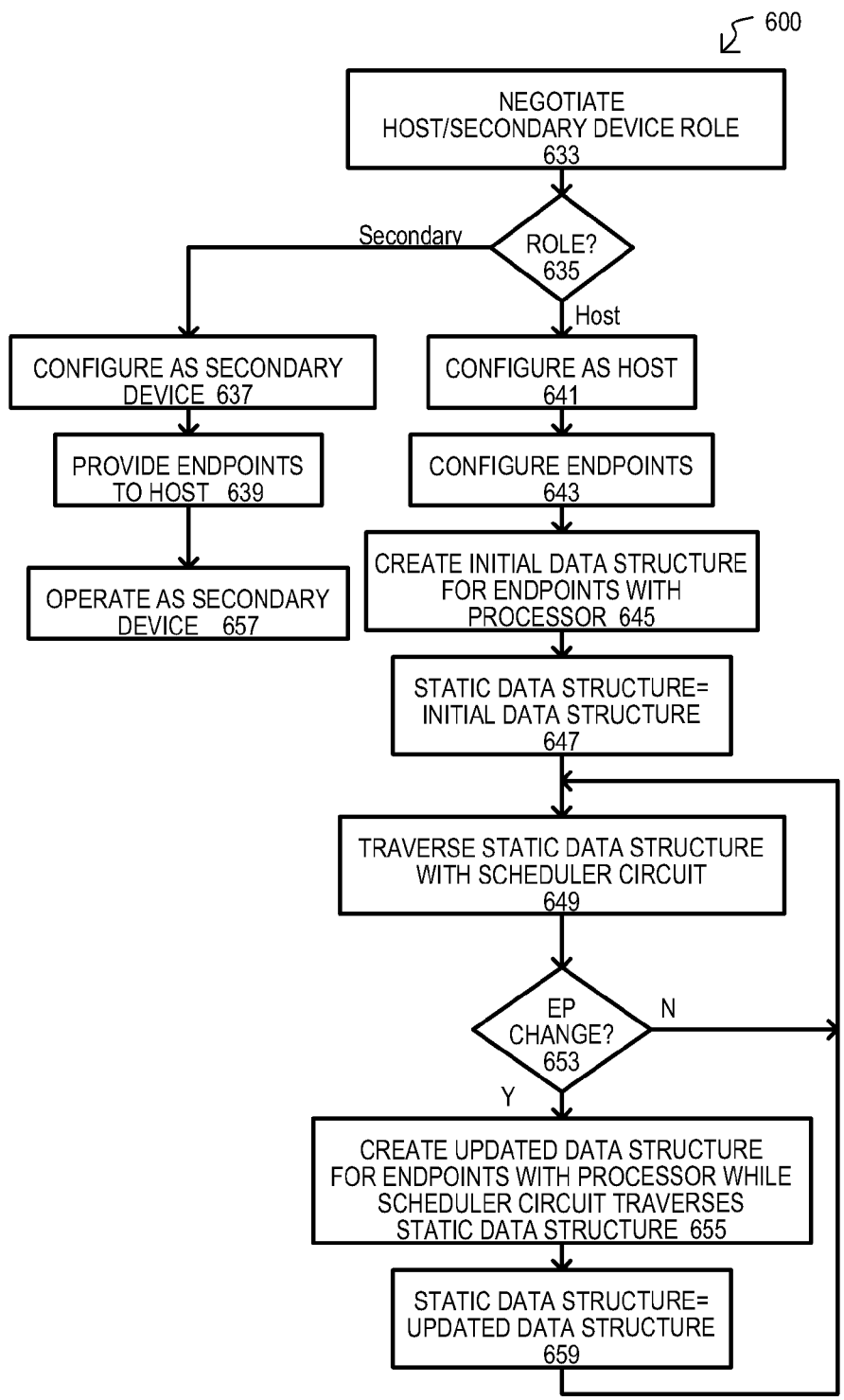
FIG. 6 is a flow diagram showing a method for a dual-purpose device according to an embodiment.

A particular dual-purpose embodiment is shown in FIG. 6.

FIG. 6 shows a method 600 according to another embodiment. A method 600 can be performed by a dual purpose device. A method 600 can include negotiating a host or secondary role 633. Such an action can include one device communicating with another device via a communication channel to establish which device will function as a host, and which device(s) will function as a secondary device. Such an action can be according to any suitable protocol. In one very particular embodiment, a negotiation (633) can be according to the Host Negotiation Protocol (HNP) of the USB OTG specification, and thus can be between two devices.

If a device determines it is a secondary device (secondary from 635), the device can configure itself as a secondary device 637. In particular embodiments, such an action can include the device resetting itself. Once configured, the device can enable its endpoints to be provided to the host (i.e., other device of the negotiation) 639. The (now) secondary device can then operate as a secondary device 657, sending and/or receiving data according to permissions established by the host device.

If a device determines it is a host (host from 635), the device can configure itself as a host 641. As a host, a device can configure endpoints 643. Such an action can include determining endpoints of any secondary devices. An initial data structure can be created from the endpoints by a processor 645. Such an action can include any of those described in embodiments herein, or equivalents. The initial data structure can be designated as a static data structure 647. In very particular embodiments, such an action can include writing data (e.g., start address, start pointer) to a register accessible by a scheduler circuit that indicates a starting point of the initial data structure.

A method 600 further includes traversing the static data structure with a scheduler circuit 649. As in embodiments above, a scheduler circuit can be different from the processor indicated in box 645. Traversing the static data structure can be according to any of the embodiments shown herein, or equivalents.

A method 600 can detect changes in endpoints 653. Absent any endpoint changes (N from 653) a method can continue having a scheduler circuit traverse the static data structure (649). However, if endpoint changes are indicated (Y from 653), an updated data structure can be created with a processor, while the scheduler circuit traverses the static data structure 655. The updated data structure can be designated as a (new) static data structure 659. A method 600 can then return to having the scheduler circuit traverse the (now new) static data structure 649.

Having described various devices and methods according to embodiments, additional integrated circuit embodiments will now be described.

Figure 7:
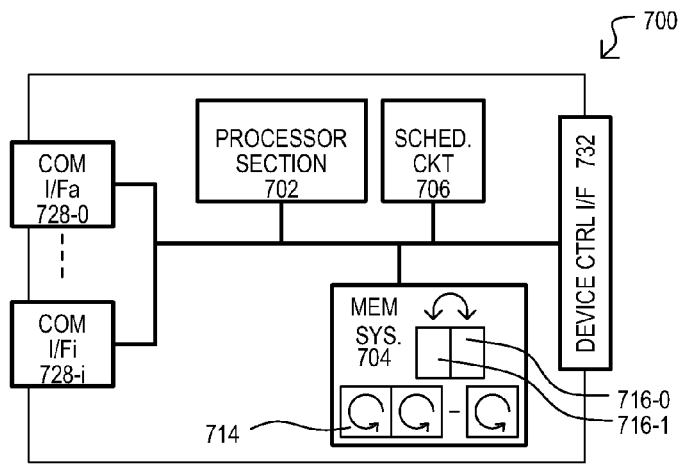
FIG. 7 is a block schematic diagram of an integrated circuit device according to an embodiment.

FIG. 7 is block schematic diagram of an integrated circuit device 700 according to an embodiment. An integrated circuit (IC) device 700 can be a bus host controller type device. In some embodiments, an IC device 700 can be a monolithic device, being formed in one substrate. However in alternate embodiments, an IC device 700 can be composed of two or more ICs formed in one IC package (e.g., multi-chip module).

An IC device 700 can include a processor section 702, a scheduler circuit 706, one or more communication interfaces 728-0 to -i, a memory system 704, and a device control interface 732. A processor section 702 can include one or more processors that can execute instructions in memory system 704. In particular embodiments, instructions in memory system 704 can configure a processor section 702 to perform processor functions noted for embodiments herein. Such functions can include, but are not limited to, forming data structures in memory system 704 that form a "ping-pong" type memory, enabling one data structure to be updated by the processor section 702 while another data structure is accessed by scheduler circuit 706. Further, a processor section 702 can write transaction requests (e.g., transfer descriptors) to a particular circular buffer assigned to an endpoint within memory system 704.

A scheduler circuit 706 can include logic circuits that implement a state machine for traversing data structures stored in memory system 704. In particular embodiments, a scheduler circuit 706 can switch between at least two different data structures in response to processor section 702. Thus, as noted above, as one data structure is traversed by scheduler circuit 706, the other data structure can be updated by processor section 702.

A memory system 704 can include one or more memories (i.e., nonvolatile, volatile) that store data structures as described for embodiments herein, or equivalents. In the particular embodiment shown, a memory system 704 can store endpoint data structures 716-0/1 and circular buffers (one shown as 714), where each circular buffer stores pointers for data transfers for an endpoint. As noted above, a memory system 704 may also store instructions for execution by processor section 702, in the event a processor section 702 includes a CPU, or the like.

Communication interfaces (728-0 to -i) can enable data accessed by scheduler circuit 706 to be transmitted over one or more communication channels. As noted above, communication channels can include buses and/or wireless links.

A device control interface 732 can provide an interface for providing control signals to an IC device 700. In particular embodiments, a device control interface 732 can enable any of: the programming of nonvolatile memory 730, the application of one or more reset signals, timing signals, or other control inputs.

Figure 8:
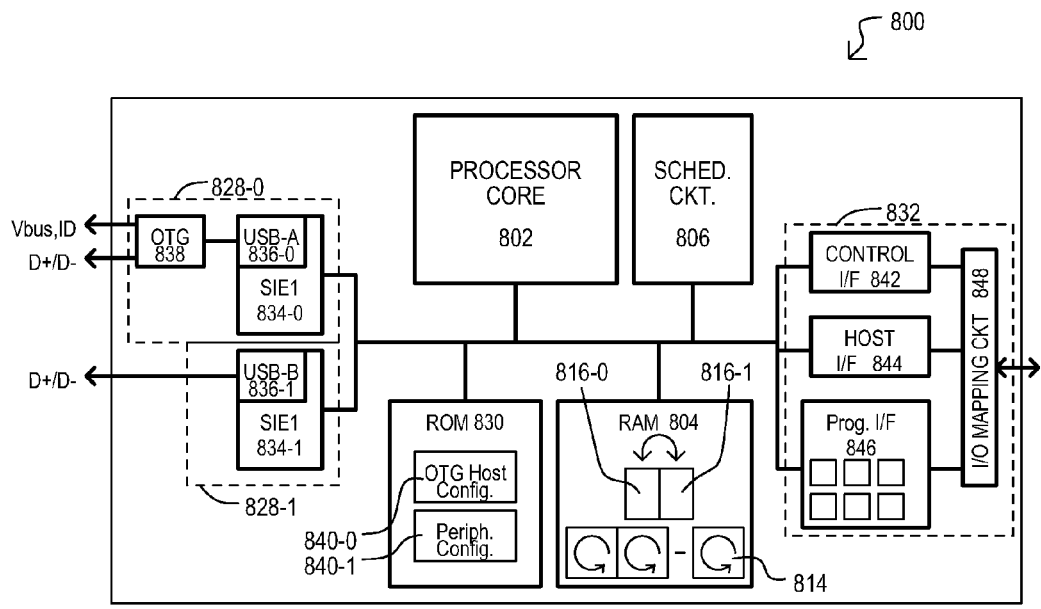
FIG. 8 is a block schematic diagram of an integrated circuit device according to another embodiment.

FIG. 8 is block schematic diagram of an IC device 800 according to another embodiment. In one particular embodiment, an IC device 800 can be one implementation of that shown in FIG. 7. In the embodiment shown, an IC device 800 can be a programmable USB OTG host/peripheral controller. An IC device 800 can function as either a USB host or a USB peripheral (i.e., device, as opposed to host). In one embodiment, IC device 800 can be a single integrated circuit IC device 800 can include a processor section 802, a scheduler circuit 806, communication interfaces 828-0/1, a read only memory (ROM) 830, a random access memory (RAM) 804, and a device interface 832. A processor section 802 can include one or more processors that can be configured to operate the device 800 as a USB host or a USB peripheral. In particular embodiments, a processor section 802 can have a 16- or 32-bit reduced instruction set computing (RISC) type architecture. However, alternate embodiments can include any suitable processor architecture.

A scheduler circuit 806 can be formed from logic circuits separate from the processor section 802. A scheduler circuit 806 can operate in any suitable manner described for embodiments herein, including switching between two or more different endpoint data structures "on-the-fly" in response to indications from processor section 802. A scheduler circuit 806 can be formed with dedicated logic (e.g., hardwired). In addition or alternatively, all or a portion of, scheduler circuit 806 can be formed with by configuring programmable logic on the IC device 800.

In the particular embodiment shown, communication interface 828-0 can be a USB OTG interface that includes a serial interface engine (SIE) 834-0, a USB interface 836-0, and an OTG interface 838. SIE 834-0 can perform various functions for data transmitted over a USB serial bus, including but not limited to parallel-to-serial conversion, packet formation, error checking, data encoding/decoding, clock recovery, and packet sequencing. A USB interface 836 can include transceivers for transmitting and receiving a serial data stream according to a USB standard. OTG interface 838 can provide circuits to support the USB OTG specification, including but not limited to switchable internal resistors and power sources for driving a Vbus line. The other communication interface 828-1 can be a standard (i.e., not an OTG USB) USB interface that includes SIE 834-1 and USB interface 836-1.

It is understood that interfaces 828-0/1 can comply with any suitable USB standard, including but not limited to USB 2.0 and 3.0.

ROM 830 can store basic-input-output-system (BIOS) code for configuring the IC device 800. In the embodiment shown, ROM 830 can store configuration data to configure the IC device as a USB host 840-0 or as a USB peripheral 840-1. In a very particular embodiment, based on results of an USB OTG Host Negotiation Protocol, an IC device 800 can load either configuration data 840-0 (and therefore operate as a USB host) or configuration data 840-1 (and therefore operate as a USB peripheral).

RAM 804 can form all or a portion of system memory for IC device 800. A RAM 804 can be configured by processor section 802 to store data structures. In the embodiment shown, RAM 804 can store endpoint data structures 816-0/1 for ping-pong like access by scheduler circuit 806, as described herein, or equivalents. RAM 834 can also include circular buffers (one shown as 814) for each endpoint in data structures (816-0/1).

Referring still to FIG. 8, in the very particular embodiment shown, a device interface 832 can include a control interface 842, a host interface 844, a programmable interface 846, and an input/output (I/O) mapping circuit 848. A control interface 842 can enable control signals to be applied to IC device 800. Such control signals can include, but are not limited to, signals that can establish a boot state for the device, signals that can place an operating device into a state (i.e., reset signals). In addition or alternatively, a control interface 842$h$ can provide a data path for loading data into ROM 830 and/or accessing control registers of IC device 800.

A host interface 844 can enable another computing device to directly control the various portions of IC device 800. As but a few examples, a host interface 844 can enable an external host device to control the SIEs (834-0/1), access ROM 830 and/or RAM 804, and use processor section 802 and/or scheduler circuit 806 for co-processing tasks. A programmable interface 846 can include programmable blocks that can be configured into a custom interface type in response to configuration data. I/O mapping circuit 848 can provide programmable paths between various inputs/outputs of the interfaces (842, 844, 846) to external connections of the IC device 800.

While embodiments can include communication devices and methods, including integrated circuit devices, other embodiments can include systems incorporating such devices. Exemplary system embodiments will now be described.

Referring to FIGS. 9A to 9E, systems (950-A to -E) according to various embodiment are shown in various views. Each of systems (950-A to -E) can include one or more IC devices (one shown as 900) as described herein or equivalents, as well as one or more communication interfaces (one shown as 940). In very particular embodiments, an IC device 900 can be dual-purpose device, and an interface 940 can be a USB OTG type interface.

Figure 9A:
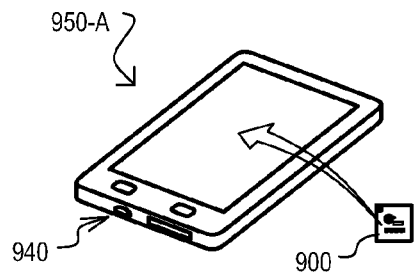
FIGS. 9A to 9E are diagrams of systems according to various embodiments.
Figure 9B:
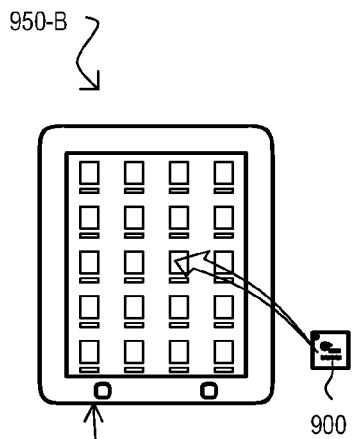
Figure 9C:
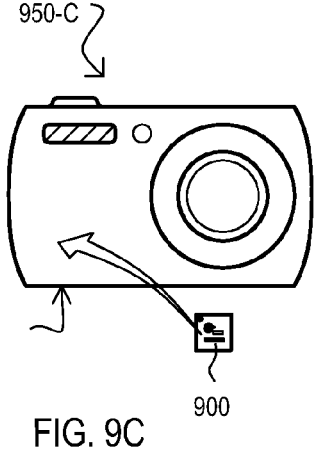
Figure 9D:
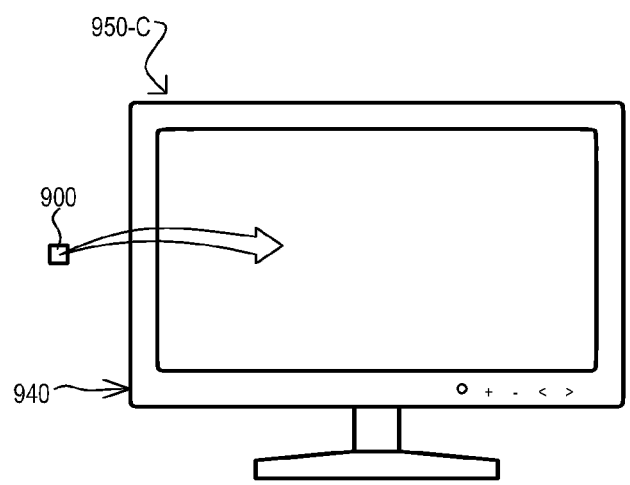
Figure 9E:
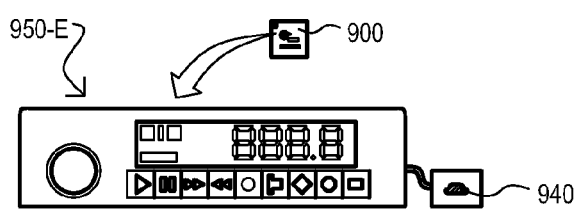

FIG. 9A shows a cell phone, personal digital assistant, small table computing device, or similar device 950-A. FIG. 9B shows a large tablet computing, or similar device 950-B. FIG. 9C shows a hand held camera 950-C for still and/or motion pictures. FIG. 9D shows a television or other monitor device 950-D. FIG. 9E shows an automobile media system 950-E.

Figure 11:
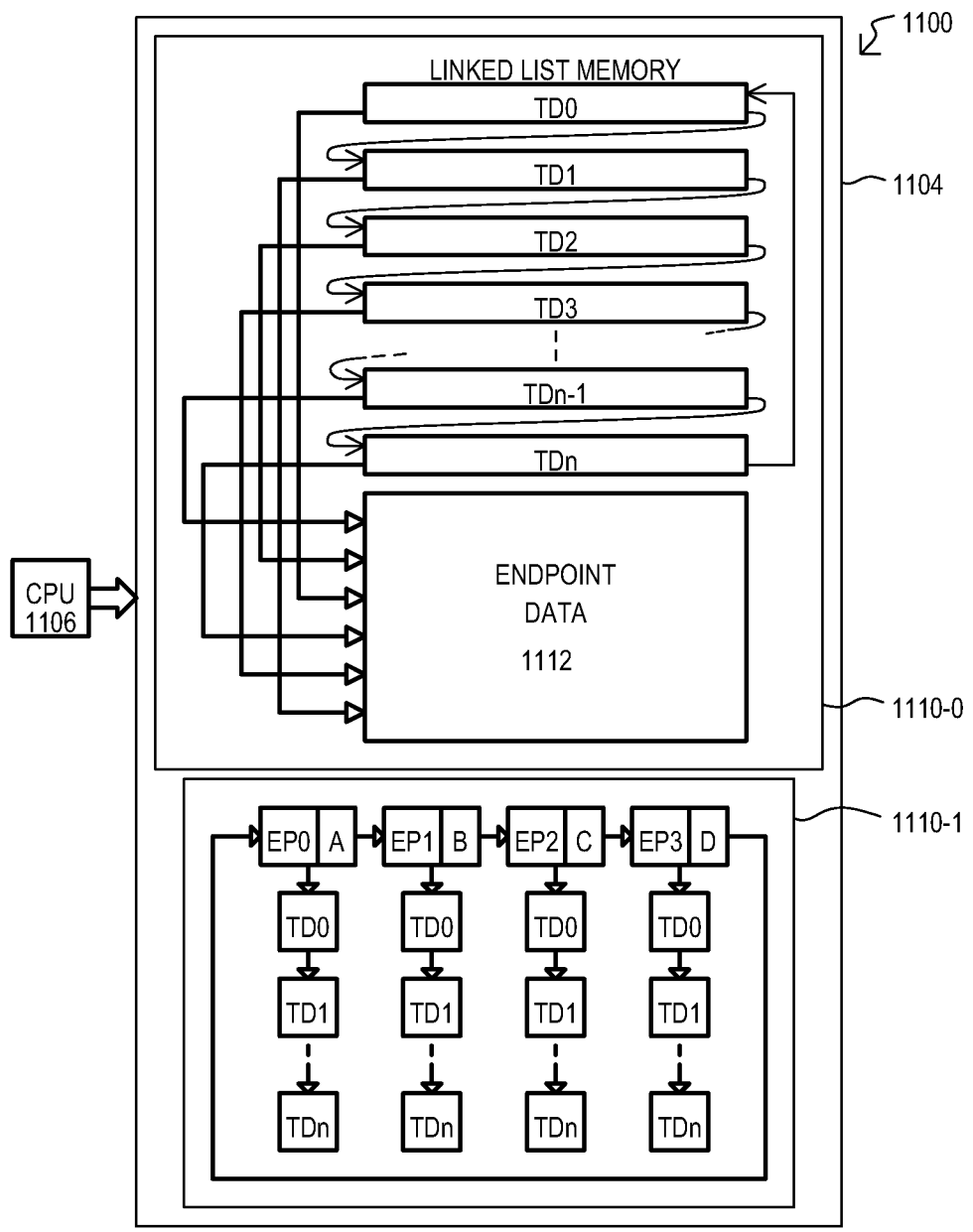
FIG. 11 is a block schematic diagram of a conventional USB system according to another embodiment.

According to the embodiments, systems (950-A to -E) can serve as host devices, enabling such system to operate with peripheral devices, such as printers, keyboards, mass storage devices, other human interface devices (e.g., mice) via a wired or wireless connection, without the need for a conventional host device, such as a desktop or laptop computer. Because systems (950-A to -E) include the various features noted for embodiments above (lower host processing bandwidth, smaller memory), such systems (950-A to -E) may provide better performance, lower power consumption and/or greater compactness (due to smaller footprint) than those using conventional approaches, like those of FIGS. 10A to 11.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A device, comprising:
a processor configured to:
- write a first data structure to a memory, the first data structure comprising a list of at least one serial data channel;
- write a second data structure to the memory, the second data structure comprising the list of the at least one serial data channel;
- modify the list in the second data structure while the first data structure is being used to transfer data; and a scheduler circuit comprising logic circuits responsive to the processor, the scheduler circuit configured to:
- transfer data to the at least one serial data channel via at least one serial data communication interface and according to the first data structure; and
- switch from transferring data according to the first data structure to transferring data according to the second data structure responsive to a modification of the list by the processor, wherein the first data structure is used to modify the list while the second data structure is being used to transfer data.

2. The device of claim 1, wherein:
the first data structure comprises a descriptor for each data channel, each descriptor including a pointer to a data buffer structure for the data channel.

3. The device of claim 1, wherein:
the device comprises a universal serial bus (USB) host;
the first data structure comprises USB endpoint descriptors; and
the at least one serial data communication interface is a USB interface.

4. The device of claim 1, wherein:
the processor is further configured to generate and write the second data structure to the memory in response to changes in the list of the at least one data channel.

5. The device of claim 1, further including:
at least one data buffer structure corresponding to each data channel; and
the scheduler circuit is configurable to execute data transfers to each data buffer structure according to the first data structure.

6. The device of claim 5, further including:
each data buffer structure comprises a plurality of data pointers, each data pointer identifying a physical address in a buffer store.

7. The device of claim 6, wherein:
each data buffer structure is a circular buffer comprising:
- a plurality of buffer pointers, each buffer pointer identifying a different physical address in the buffer store, and
- a next buffer pointer in a sequence;
wherein the last buffer pointer in the sequence points to the first buffer pointer in the sequence.

8. The device of claim 5, further including:
the data buffer structure is formed in a different memory than the first data structure.

9. The device of claim 1, wherein:
the device is configurable to operate as a host device or secondary device; and
the processor is configurable to write the first data structure when the device is configured as the host device.

10. The device of claim 9, wherein:
the device is configurable to operate as a universal serial bus (USB) host or USB peripheral;
the processor is configurable to write the first data structure when the device is configured as a USB host; and
the at least one serial data communication interface is a USB on-the-go (USB OTG) interface.

11. A method, comprising:
forming an initial data structure in a memory by operation of a processor, the initial data structure comprising data for at least one endpoint;
forming an updated data structure in the memory by operation of the processor, the updated data structure comprising the data for the at least one endpoint, wherein the updated data structure is used to modify the data for the at least one endpoint while the initial data structure is being used to transfer data for endpoints;
traversing the initial data structure with a scheduler circuit different from the processor to transfer the data for the endpoints via a serial data communication interface; and
switching from traversing the initial data structure to traversing the updated data structure to transfer the data for the endpoints, wherein the initial data structure is used to modify the data for the at least one endpoint while the updated data structure is being used to transfer the data for the endpoints.

12. The method of claim 11, further including:
in response to changes in endpoints;
- forming the updated data structure in the memory by operation of the processor, the updated data structure including said changes in endpoints, and
- ceasing traversal of the initial data structure and traversing the updated data structure with the scheduler circuit.

13. The method of claim 12, wherein:
the scheduler circuit ceases traversal of the initial data structure and traverses the updated data structure without interruptions in the transfer of data for the endpoints.

14. The method of claim 12, wherein:
further in response to changes in endpoints;
- prior to ceasing traversal of the initial data structure, storing state data for an endpoint being processed by the scheduler circuit; and
- traversing the updated data structure includes utilizing the state data.

15. The method of claim 11, further including:
designating a buffer structure for each endpoint; and
as transfer data is available for an endpoint, transferring data to the data buffer by operation of the scheduler circuit, regardless of whether all transfer data has been received, the pointer including the physical address of the transfer data.

16. The method of claim 15, further including:
transferring data to the buffer structure includes the scheduler circuit accessing a sequence of buffer pointers for each endpoint, each buffer pointer indicating a physical address of a buffer store.

17. The method of claim 15, wherein:
traversing the initial data structure with the scheduler circuit includes, for each endpoint, determining if a transfer data for the buffer structure exists, and if a transfer data does not exist, proceeding to a next endpoint in a sequence.

18. The method of claim 11, wherein:

transferring the data for the endpoints via the serial data communication interface includes transferring packets according to a universal serial bus (USB) protocol.

19. The method of claim 11, further including:

negotiating between a first device and at least a second device to determine a role as a host or secondary device in a system;

if the first device assumes the host role;
- forming the initial data structure by operation of the processor in the first device, the initial data structure comprising at least one endpoint corresponding to the second device; and
- traversing the initial data structure with the scheduler circuit in the first device.

20. The method of claim 19, wherein:

the serial data communication interface comprises a universal serial bus on-the-go (USB OTG) interface.

\* \* \* \* \*